(12) United States Patent
Gross (10) Patent No.: US 11,104,441 B2
(45) Date of Patent: Aug. 31, 2021

(54) FASTENING SYSTEM FOR PASSENGER SEATS IN A CABIN OF A VEHICLE

(71) Applicant: Airbus Operations GmbH, Hamburg (DE)

(72) Inventor: Claus-Peter Gross, Hamburg (DE)

(73) Assignee: Airbus Operations GmbH

( * ) Notice: Subject to any disclaimer, the term of this patent is extended or adjusted under 35 U.S.C. 154(b) by 74 days.

(21) Appl. No.: 16/369,184

(22) Filed: Mar. 29, 2019

(65) Prior Publication Data

US 2019/0308736 A1    Oct. 10, 2019

(30) Foreign Application Priority Data

Apr. 6, 2018    (DE) ..................... 10 2018 108 190.1

(51) Int. Cl.
*B64D 11/06*    (2006.01)
*B60N 2/015*    (2006.01)
*B60N 2/06*    (2006.01)

(52) U.S. Cl.
CPC ...... *B64D 11/0696* (2013.01); *B60N 2/01516* (2013.01); *B64D 11/0639* (2014.12); *B60N 2/06* (2013.01)

(58) Field of Classification Search
CPC ............ B64D 11/0696; B64D 11/0639; B60N 2/01516; B60N 2/0155; B60N 2/01558; B60N 2/06; B60P 7/0815; F16C 29/045; F16C 13/006
USPC ......... 248/430, 503.1; 296/65.13; 244/118.6; 410/105
See application file for complete search history.

(56) References Cited

U.S. PATENT DOCUMENTS

| 4,183,493 | A | * | 1/1980 | Koutsky | ............... | B60N 2/0707 248/430 |
| 4,611,861 | A | * | 9/1986 | Haruyama | ............... | F16C 29/04 384/18 |
| 5,178,346 | A | * | 1/1993 | Beroth | ................... | B64D 9/003 244/118.1 |
| 7,857,561 | B2 | * | 12/2010 | Mejuhas | ............ | B64D 11/0696 410/105 |

(Continued)

FOREIGN PATENT DOCUMENTS

| DE | 10 2007 004 554 A1 | 7/2008 |
| DE | 10 2011 017 752 A1 | 10/2012 |

(Continued)

*Primary Examiner* — Ingrid M Weinhold
(74) *Attorney, Agent, or Firm* — Lerner, David, Littenberg, Krumholz & Mentlik, LLP (57) ABSTRACT

A fastening system for passenger seats in a vehicle cabin has two or more guide rails to be integrated into or onto a cabin floor, and a plurality of slides, to be brought into engagement with the guide rails and having a flange for connection to a passenger seat to retain the passenger seat on a guide rail. Each guide rail has a profile cross section, perpendicularly to a main axis of extent (x), having a base region, a supporting region and an undercut situated therebetween. Each slide has a cavity, of complementary design with the profile cross section, and a necked region, to be brought into engagement with the undercut, thus enabling the supporting region to be enclosed by the cavity of the slide. Each slide has a rotatably mounted roller projecting into the necked region and can be brought into surface contact with a guide rail surface.

9 Claims, 7 Drawing Sheets

(56) References Cited

U.S. PATENT DOCUMENTS

| | | |
|---|---|---|
| 8,074,954 B2 | 12/2011 | Wilhelm et al. |
| 9,656,753 B2 | 5/2017 | Schomacker et al. |
| 2008/0197234 A1* | 8/2008 | Wilhelm .................. B64C 1/20 244/118.6 |
| 2011/0062286 A1 | 3/2011 | Pinkal |
| 2011/0309195 A1 | 12/2011 | Bishop et al. |
| 2017/0259925 A1* | 9/2017 | Olulana .................. B64C 1/20 |
| 2017/0341756 A1* | 11/2017 | Fuerstenberg ..... B64D 11/0639 |
| 2018/0134182 A1* | 5/2018 | Hoshide ............. B64D 11/0696 |
| 2018/0194476 A1 | 7/2018 | Gross |
| 2019/0315473 A1* | 10/2019 | Mochizuki ......... B64D 11/0696 |

FOREIGN PATENT DOCUMENTS

| | | |
|---|---|---|
| DE | 10 2009 004 987 B4 | 5/2014 |
| DE | 10 2013 103 662 A1 | 10/2014 |
| DE | 10 2015 116 414 A1 | 3/2017 |
| DE | 10 2015 122 675 A1 | 6/2017 |
| EP | 2695813 A2 | 2/2014 |
| FR | 2 972 971 B1 | 10/2014 |
| JP | 2007 196 843 A | 8/2007 |
| WO | 2016/181623 A1 | 11/2016 |
| WO | 2017/064288 A1 | 4/2017 |

* cited by examiner

FASTENING SYSTEM FOR PASSENGER SEATS IN A CABIN OF A VEHICLE

FIELD OF THE INVENTION

The invention relates to a fastening system for passenger seats in a cabin of a vehicle, to a passenger seat system for a cabin of a vehicle and to a vehicle having a cabin.

BACKGROUND OF THE INVENTION

Floor rails for fastening passenger seats and other devices in variable positions are often used in vehicles that serve to carry passengers. The floor rails can have fastening means which are arranged in a certain grid pattern. The grid pattern makes it possible to implement different fastening positions on the floor rails. Fastening the relevant object in a desired position is generally accomplished by means of a retaining device, which performs positive and/or nonpositive retention with fastening means of the floor rail.

There is furthermore a known practice, especially in aircraft, of determining and, where appropriate, occasionally or regularly changing a spacing between successive seats in a longitudinal direction, according to preference or temporary requirements. For this purpose, the retaining devices of relevant seats are released, and the seats are then moved along the floor rail and the retaining devices are locked again. Changing the spacing, particularly between two passenger seats arranged in succession, can change the seating class of the relevant section in the passenger cabin. The use of sliding guides with guide rails for easier movement is known.

DE 10 2009 004 987 B4 shows a movable seat for a means of transport, having a seat frame for movable mounting on a support structure of the means of transport, wherein the seat is embodied in such a way that two seats arranged in succession in the means of transport have a smaller joint area in a stored state, in which they are pushed together and at least partially into one another, than in a state of use, in which they are pushed apart.

DE 10 2013 103 662 A1 shows a holding device for fastening passenger seats in a means of transport, said device having a seat leg fixing element, a sliding element and a rail element.

BRIEF SUMMARY OF THE INVENTION

The use of the above-mentioned guide rails generally requires covers, which have to be adapted to the respective position of the passenger seats moved on the guide rails. Adaptation can be accomplished through the sliding movement of the relevant passenger seat or through manual interaction with a user.

An aspect of the invention proposes a fastening system for passenger seats in a cabin of a vehicle in which an adapted cover of a guide rail can be implemented as simply as possible or in which adaptation itself is completely unnecessary.

A fastening system for passenger seats in a cabin of a vehicle is proposed, the fastening system having two or more guide rails that can be integrated into or onto a floor of the cabin, and a plurality of slides, which can be brought into engagement with the guide rails and which have a flange for connection to a passenger seat in order to retain the relevant passenger seat on a guide rail, wherein each guide rail has a profile cross section, perpendicularly to a main axis of extent, which has a base region, a supporting region and at least one undercut situated therebetween, wherein each slide has a cavity, which is of complementary design with the profile cross section of the rail, and a necked region, which can be brought into engagement with the undercut, thus enabling the supporting region to be enclosed by the cavity of the slide, and wherein each slide has at least one rotatably mounted roller, which projects into the necked region and can be brought into surface contact with a surface of the guide rail.

According to an embodiment of the invention, a guide rail is an elongate component which can be arranged on or in a floor of a cabin of the relevant vehicle. The guide rail can be connected directly to a structure supporting the floor. As an alternative, a guide rail can also be connected to floor rails, which are connected to the structure supporting the floor. In the latter case, a guide rail can also be retrofitted in a vehicle by equipping the existing floor rails therewith. The guide rails are provided for the purpose of guiding a slide mentioned along a predetermined direction of movement and of introducing all the loads associated with passenger seats supported by the slide into the guide rails. Consequently, the guide rails should be configured in such a way that they can be connected firmly to a floor structure along their entire length and are mechanically capable of absorbing all the loads which occur.

The guide rails have a profile cross section which is considered perpendicularly to the main axis of extent thereof for the sake of explaining the advantages of significance for the invention. This profile cross section could preferably be symmetrical, but this is not necessarily required. The profile cross section is distinguished by two significant regions, which are referred to as the base region and the supporting region. The base region is provided for the purpose of forming a base for the guide rail which can be connected to some other device. For instance, it could have connecting means which allow connection to a structure and/or to a floor rail. In a simple case, the base region can have a flat shape and can be embodied in the form of a flange or chord, for example, as in the case of steel profiles. The supporting region, for its part, is provided for the purpose of projecting into the cabin in order to bring about engagement with the slide there. For this purpose, an undercut is arranged between the base region and the supporting region, allowing the supporting region to be enclosed by the cavity of the slide.

To guide the slide on the guide rail, each slide has at least one rotatably mounted roller. This projects into the necked region of the cavity and can therefore be brought into surface contact with the surface of the guide rail. Here, the surface contact refers to a contact between the circumferential surface of the at least one roller and the surface of the supporting region. The requirement for surface contact leads to mutually matched configuration particularly of the supporting region and the contour of the circumferential surface of the relevant rollers. By virtue of the surface contact, the roller is made to rotate as the slide is moved along the main direction of extent of the guide rail, and thus the roller runs along the guide rail.

The use of a roller allows the defined introduction of forces into the guide rail via the surface contact concerned. Through the selection of the size of the relevant roller, the characteristics and geometric configuration of the surface thereof, the number of rollers used and the alignment thereof with respect to the supporting region, it is possible to determine the level of forces to be transmitted. At the same time, the frictional forces can be significantly reduced.

Moreover, such a configuration is significantly more robust in respect of deviations from component dimensions and contamination.

The contour of the undercut and of the supporting region per se can be of rounded configuration overall, minimizing notch forces and furthermore simplifying manufacture. The absence of sharp edges and narrow cavities furthermore leads to a lower susceptibility to any contamination.

Overall, the fastening system according to an embodiment of the invention can implement a smooth-running way of moving passenger seats, can reduce susceptibility to contamination and can simplify load-oriented design.

To further reduce possible contamination, the fastening system can furthermore have a flat cover element, which is fixed on the supporting region. The cover element can be implemented in the form of a material which corresponds to an adjoining carpet, for example. By virtue of the advantageous embodiment of the guide rail, it is not necessary to track the current position of the slide with the cover element at all times. On the contrary, the use of rollers makes possible a sufficient spacing between the slide and an upper side of the guide rail to allow the permanent mounting of a cover element. Fixing can comprise adhesive bonding, mounting or some other kind of fixed or releasable connection.

In an advantageous embodiment, the profile cross section has two mutually opposite undercuts. It is thereby possible, in particular, to implement a symmetrical profile cross section. The load to be introduced from a passenger seat or a passenger seat group into the guide rail can therefore take place symmetrically at each slide if the profile cross section is in contact with rollers on both sides.

The slide could have two mutually spaced rollers for each undercut, which can each be brought into surface contact with the surface of the guide rail. If the profile cross section has two undercuts, the slide consequently has at least four rollers. Both pairs of rollers, which in each case consist of two rollers arranged spaced apart from one another along the main direction of extent, lead to precise alignment of the slide relative to the guide rail. Consequently, there are at least sixteen rollers for each passenger seat or each passenger seat group implemented on a single frame if each foot of the relevant frame is equipped with a dedicated slide.

Accordingly, the profile cross section could have two mutually opposite undercuts, wherein the slide has at least one pair of mutually opposite rollers for engagement in two mutually opposite regions of the profile cross section.

All the rollers could be arranged in a common plane and could be mounted so as to be rotatable about an axis which is perpendicular to the common plane. When using a total of four rollers, the common plane can extend parallel to the floor on which the fastening system is arranged. When considered vectorially, the movement of the circumferential surface of each roller is accordingly likewise in this plane. It is thereby possible to implement a flat slide.

At least one slide could have a movably mounted retaining body, which can be moved into the cavity and out of the cavity, wherein the guide rail has latching openings, which can be brought into engagement with the retaining body when the slide is in engagement with the guide rail. The retaining body is used to fix the slide on the guide rail. It can have virtually any desired shape that gives it the capacity to be moved into and out of a latching opening of the guide rail. In a particularly simple case, the retaining body can have an elongate shape, in particular with a largely constant profile cross section. The retaining body could preferably be moved perpendicularly to a plane which is parallel to the floor. Of course, the latching openings of the guide rail should be made complementary with the retaining body, thus enabling the retaining body to be moved easily in the relevant latching opening. The covering of the latching openings by a cover element is not absolutely essential. However, it is conceivable, in addition to an abovementioned cover element bonded in a fixed manner, to use separate elements for individual latching openings, these elements being easily removable from the latching openings.

The retaining body is preferably a sprung pin, which is urged by a spring force into a neutral position, in which the pin is in the cavity. The retaining body is thereby constantly urged into a position in which it retains the slide. The retaining body can have a corresponding offset or a stop surface for surface contact with a spring. If the relevant passenger seat or the relevant passenger seat group is to be moved along the guide rail, the retention can be eliminated by releasing the retaining body from the neutral position in order then to move the passenger seat or the passenger seat group. During the moving process, the retaining body can be prevented from snapping into a latching opening by a corresponding catch or by manual action on the retaining body, e.g. via a Bowden cable or the like. When the relevant slide reaches its predetermined position, the retaining body can snap into a latching opening again. For this purpose, the temporary catch retention thereof must be cancelled.

In a particularly advantageous embodiment, the retaining body is arranged in a guide and ends with an outer surface of the guide when it is in its neutral position. In an unretained position, the retaining body is already clearly noticeable optically. A user can accordingly recognise very easily whether retention has been successfully performed. This can be enhanced even further by optically conspicuous colouring. It is conceivable to provide a section of the retaining body which projects from the guide with a bright colour, e.g. yellow, orange, red or a neon colour.

Furthermore, the roller could have a circumferential groove which is matched to a contour of the surface of the guide rail. The groove allows force transmission in a direction which corresponds to the extent of the axis of rotation of the respective roller. While force transmission in the radial direction is already achieved by the circumferential surface of each roller, the groove can lead to force transmission in the axial direction in combination with the supporting region. Each of the rollers of a slide is preferably provided with a groove of this kind.

The slide preferably has at least one projection, which projects into the necked region and forms a clearance fit with the undercut. Safety during the use of the fastening system according to the invention is thereby enhanced. In the unlikely event of a mechanical impairment of one of the rollers, the projection can enter into a positive connection with the guide rail. During the normal state, in which the guide rail is engaged by all the surrounding rollers, the projection does not cause an obstruction, however, owing to the clearance fit. In each position of the slide along the main direction of extent of the guide rail, it is then at a certain distance from the surface of the guide rail and consequently cannot impair a sliding movement.

The invention furthermore relates to a passenger seat system for a cabin of a vehicle, which has at least one passenger seat device having a seat frame, and a fastening system in accordance with the above description, wherein the fastening system has two mutually spaced guide rails extending parallel to one another, wherein the seat frame of the at least one passenger seat device has two pairs of mutually spaced seat legs, which are each connected to one slide, and wherein the slides are in engagement with the guide rails.

As already mentioned above, the guide rails in the passenger seat system can be capable of being fastened on seat rails arranged in a floor of a cabin of the vehicle.

Finally, the invention relates to a vehicle having a cabin, a cabin floor and at least one passenger seat system of this kind.

The vehicle is preferably an aircraft, in particular a passenger aircraft.

BRIEF DESCRIPTION OF THE DRAWINGS

Further features, advantages and possible uses of the present invention will be found in the following description of the embodiment examples and the figures. Here, all the features described and/or depicted, in themselves and in any desired combination, form the subject matter of the invention, even when considered independently of their combination in the individual claims or the dependency references thereof. In the figures, the same reference signs furthermore stand for identical or similar objects.

DETAILED DESCRIPTION

Figure 1:
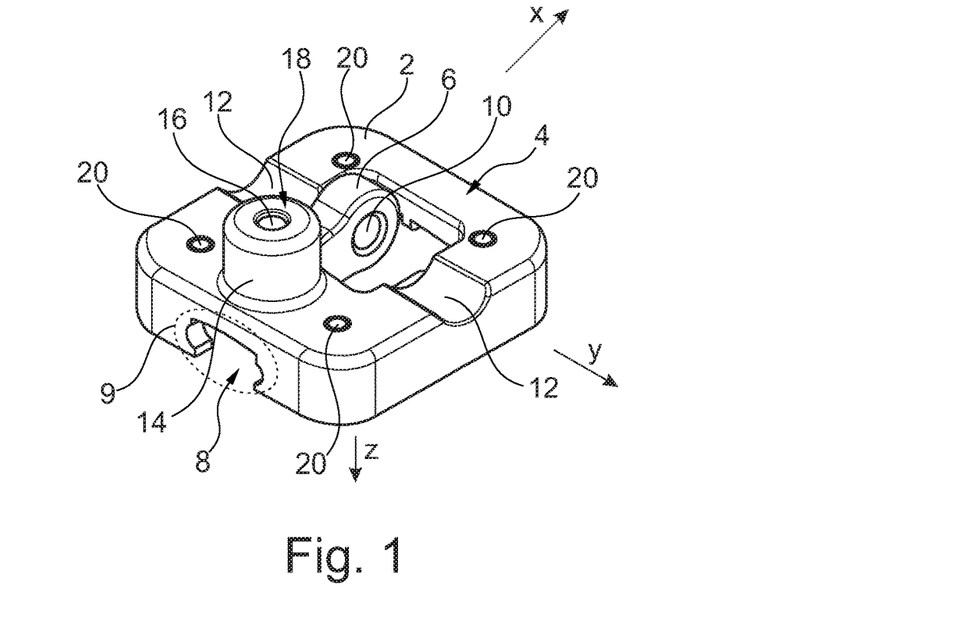
FIGS. 1 to 4 show a slide of a fastening system in different views.
Figure 4:
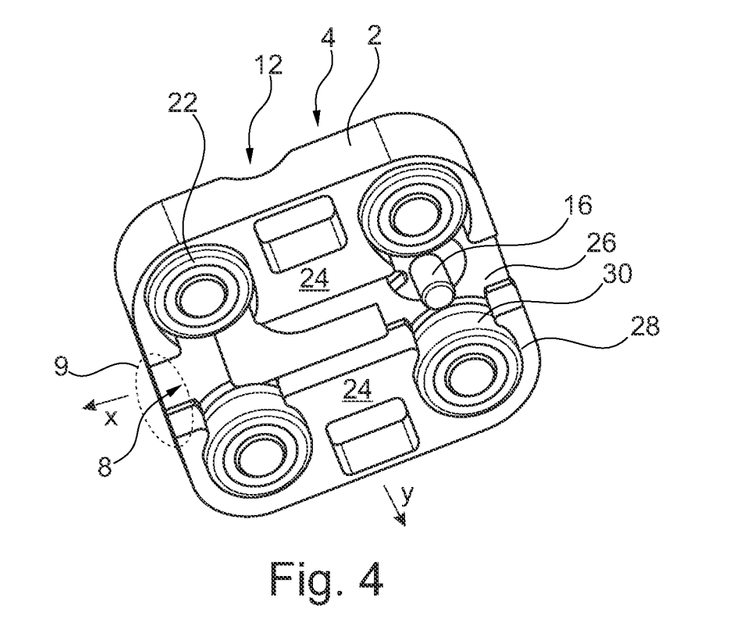
Figure 5:
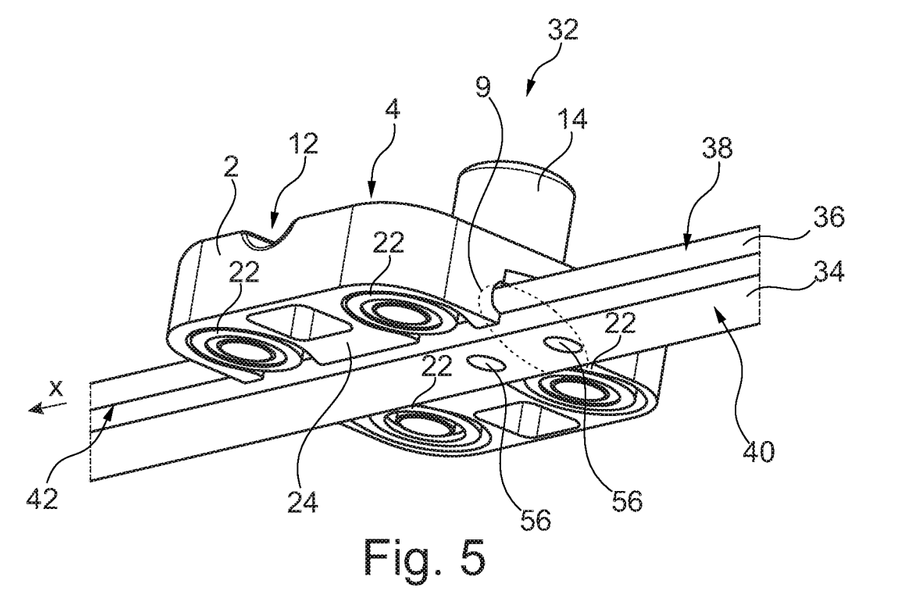
FIGS. 5 and 6 show a fastening system in a three-dimensional illustration with rollers (FIG. 5) and without rollers (FIG. 6).

FIG. 1 shows a slide 2 for use in a fastening system, which is shown in FIG. 5, for example. The slide 2 has, by way of example, an approximately square basic shape with rounded corners. FIG. 1 shows, in particular, an upper side 4, on which a flange 6 for fastening a passenger seat is arranged. The slide 2 has a cavity 8, which extends along the longitudinal axis x. The possible configuration thereof is illustrated in subsequent figures, in particular from FIG. 4. In this illustration, it can be seen that the cavity 8 has a profile cross section, which has a necked region 9. This means that the profile cross section is narrower at an underside, which faces away from the flange 6, than in regions further towards the upper side, which are closer to the flange 6.

By way of example, the flange 6 has a ring shape and is attached rigidly on one side to the slide 2. Of course, the flange 6 can also be attached to the slide 2 on both sides. This can depend, in particular, on the type and embodiment of the seat foot to be fastened, and neither of the two versions is excluded. An opening 10 of the flange 6 extends in a transverse direction y and is complemented by recesses 12 on the upper side 4. The recesses 12 are shaped and positioned in such a way that an elongate element, e.g. a cylindrical element, could rest in both recesses 12 and, at the same time, extends through the opening 10 in the flange 6. This ensures that a connecting means extending through the flange can be reached by means of a suitable tool. Of course, other versions are also conceivable, and this illustration should be understood only as one possible example.

Behind the flange 6 in the x direction there is a guide 14, which receives a retaining body 16. This body can be moved along a z direction, which is perpendicular to a plane defined by the x axis and the y axis. The retaining body 16 can be moved into and out of the cavity 8. In the position shown, the retaining body 16 is in a neutral position and ends approximately flush with an outer surface 18 of the guide 14. Also visible on the surface 4 are four axles 20, which are provided for mounting rollers, which can be seen in subsequent figures.

Figure 2:
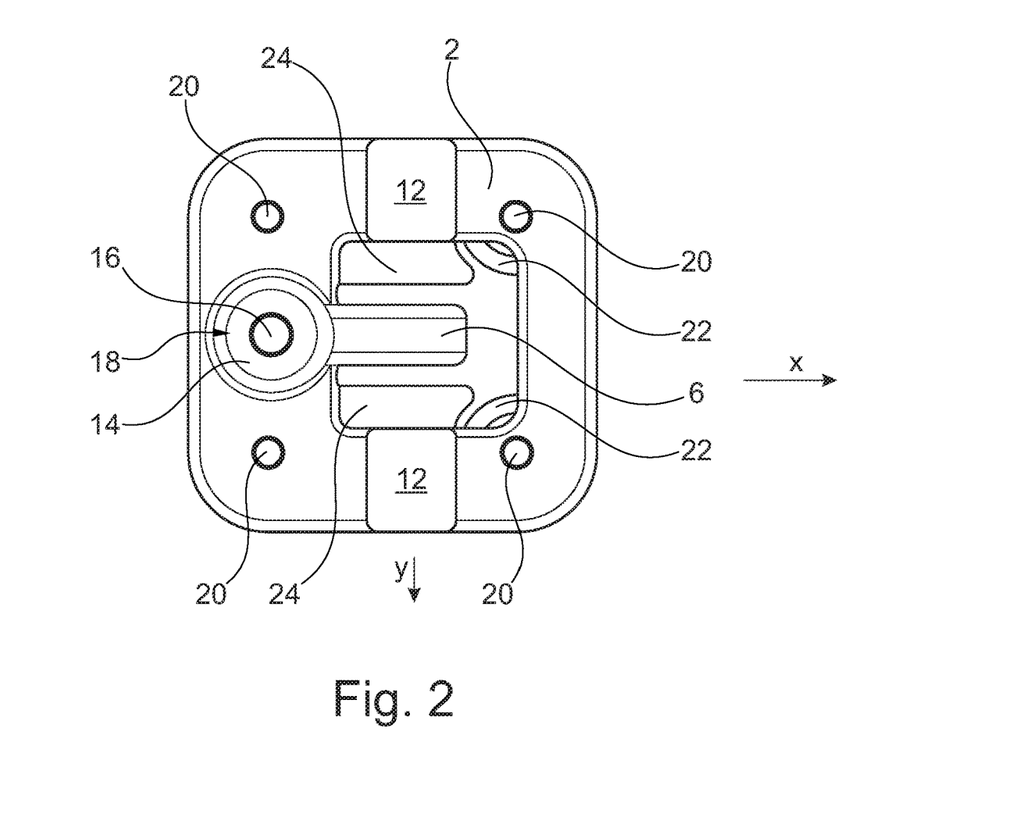

FIG. 2 shows the slide 2 in a plan view. The slide 2 corresponds fully to the slide 2 from FIG. 1. However, here it is possible to see at least two rollers 22, which are each mounted on a respective axle 20. The rollers 22 are aligned in such a way that they lie in the x-y plane. They can therefore surround a guide rail extending along the x axis in the cavity 8. Guidance is thereby provided along the x axis. As indicated by means of the two other axles 20, there is another roller pair comprising two mutually opposite rollers 22 on the opposite side along the X direction. Two projections 24 situated opposite one another in the y direction supplement an interspace between rollers 22 extending along the x axis. These could serve as a fallback element if one of the rollers 22 fails.

Figure 3:
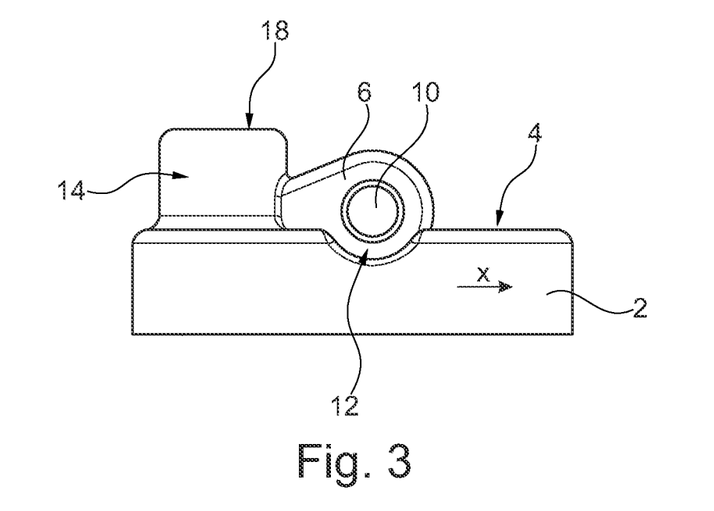

FIG. 3 shows the slide 2 in a side view. Here it is possible to see, in particular, the flat shape of the slide 2, which results from the arrangement of the rollers 22 in a common plane. The guide 14 projects a relatively long way upwards from the surface 4 of the slide 2. In the instantaneous position of the retaining body 16, it is not visible. From this, a user can see immediately that the retaining body 16 is arranged in a position retained in the slide 2, something that will be easier to understand especially from FIGS. 9-12. Furthermore, the concentric arrangement of the opening 10 and of the recesses 12 is clearly apparent.

FIG. 4 shows the slide 2 in a three-dimensional illustration from the underside. First of all, it is possible to see all four rollers 22 here. The rollers 22, the mutually opposite projections 24 and an inner, upper boundary surface 26 enclose the cavity 8. Overall, this has an elongate extent extending in the x direction. The retaining body 16 is furthermore visible from this perspective and extends a long way into the cavity 8. The rollers 22 have a circumferential surface 28, which in this case, by way of example, is traversed by a central groove 30.

Based on the above illustrations, FIG. 5 then shows part of a fastening system 32 for passenger seats, having a guide rail 34 and a slide 2 surrounding the guide rail 34. The guide rail 34 has a supporting region 36, which has two bulges 38 situated opposite one another in the y direction. The supporting region 36 rests on a base region 40 and, between the base region 40 and the supporting region 36, there are two undercuts 42 situated opposite one another in the y direction. The projections 24, which approach one another more closely than two rollers 22 situated opposite one another in the y direction, are arranged in such a way that they project with a clearance fit into the undercut 42. The rollers 22 are in engagement by means of their grooves 30 with the bulges 38. Consequently, two roller pairs, each comprising two rollers 22, surround the guide rail 34 and are additionally secured on the guide rail 34 by the projections 24. The slide 2 can thereby be guided on the guide rail 34 along the x direction.

Figure 6:
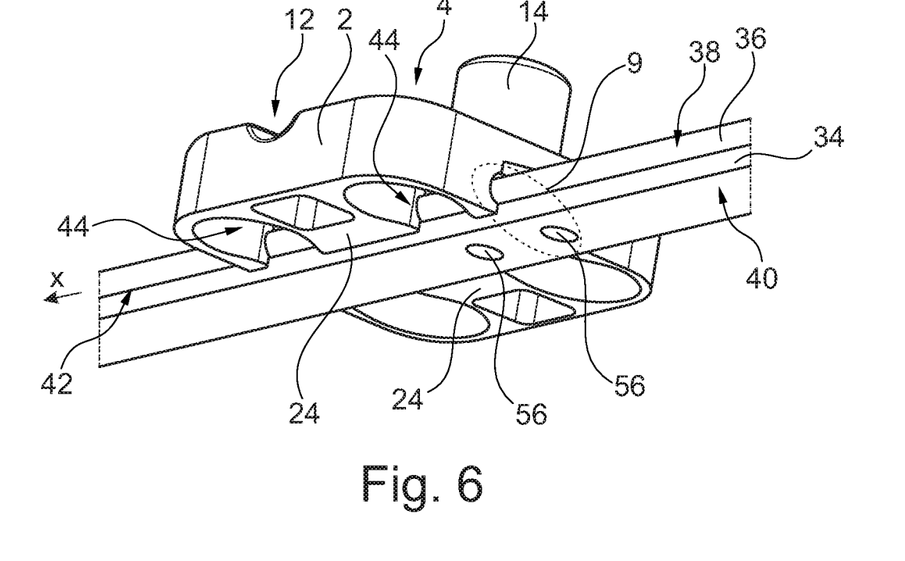

To illustrate the relative positions of the projections 24 and of receiving spaces 44 for the rollers 22, FIG. 6 shows the same illustration as FIG. 5 but with the rollers 22 removed.

Figure 7:
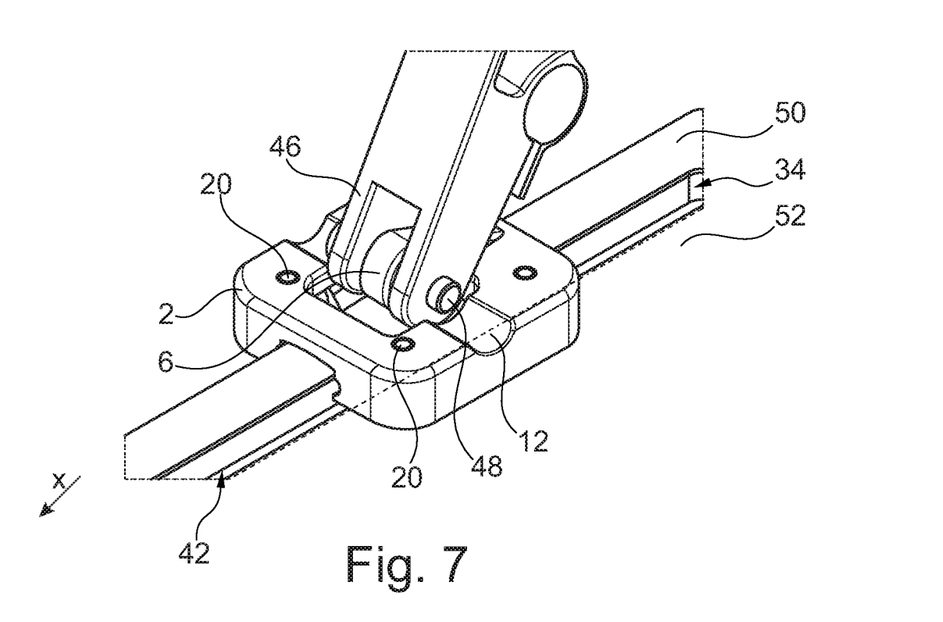
FIGS. 7 to 12 show various details of the fastening system with seat feet attached.

Meanwhile, the attachment of a passenger seat to a slide 2 is illustrated in FIG. 7. Here, a front seat foot 46, which is of fork-shaped design by way of example, is situated on the flange 6 and is secured by a bolt 48. To enable the bolt 48 to be reached from a transverse direction, the recesses 12 are advantageous since a tool can be applied here and rotated in a direction determined by the alignment of the opening 10. Through the mounting of the front seat foot 46 on the flange 6, it is possible to create an articulated joint which prevents mechanical stresses between the seat foot 46 and the slide 2.

In the illustration shown, the guide rail 34 is furthermore covered by a flat cover element 50 in order to prevent damage and contamination. By way of example, the cover element 50 can be implemented in the form of a strip-shaped carpet section, which can correspond to the surrounding carpet 52 on both sides of the guide rail 34. Embodiment of the cavity 8 to implement a mechanically simple and low-cost cover 50 of this kind is readily possible by allowing a sufficient vertical clearance with respect to the guide rail.

Figure 8:
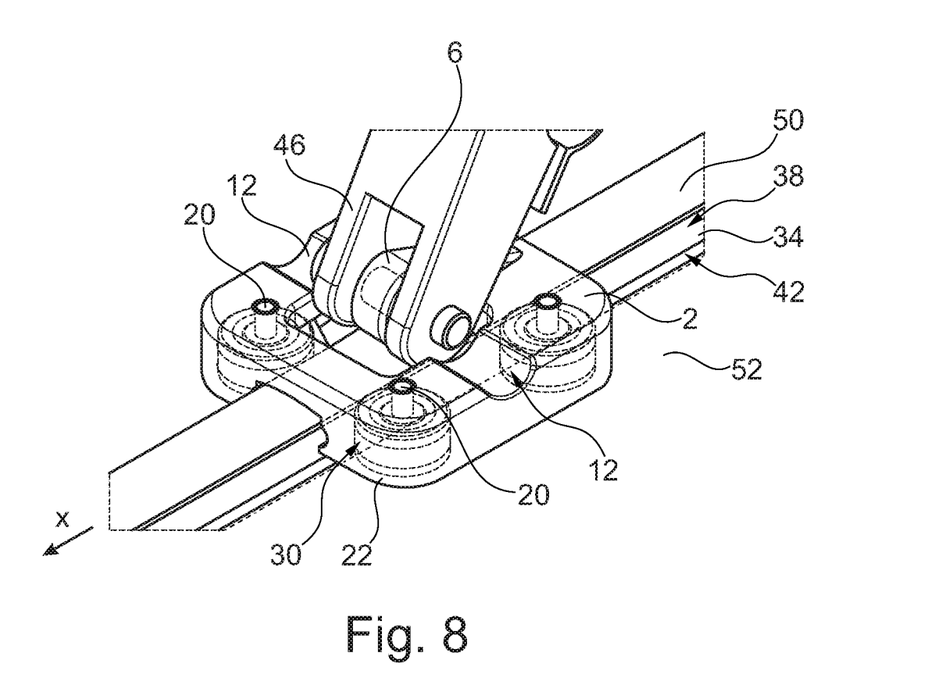

The same illustration is shown in FIG. 8 with a transparent outer shell of the slide 2. Here, it can be seen how the grooves 30 of the rollers 22 are in engagement with the bulges 38 of the guide rail 34.

Figure 9:
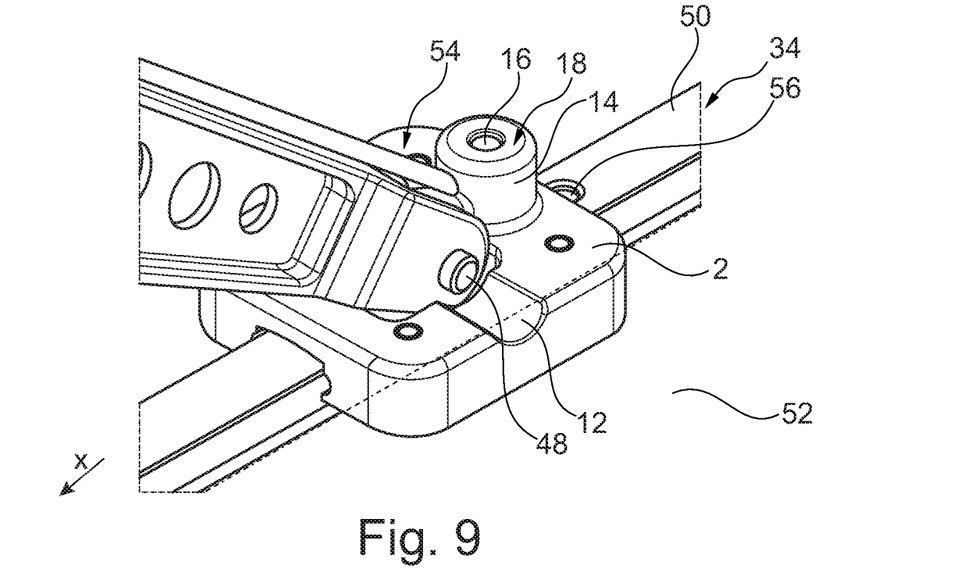

FIG. 9 shows a rear seat foot 54, which is connected to the slide 2 in the same way as the front seat foot 46. It can furthermore be seen that the retaining body 16 ends flush with the outside 18 of the guide 14 and therefore projects into the cavity 8. Arranged in the guide rail 34, directly behind the slide 2, there is a latching opening 56, which serves to receive the retaining body 16. Since said body is in a lowered neutral position, a further latching opening 56 is positioned directly below the retaining body 16. The entry of the retaining body 16 into a latching opening 56 ensures retention in the x direction, ensuring that the slide 2 retains its set position.

Figure 10:
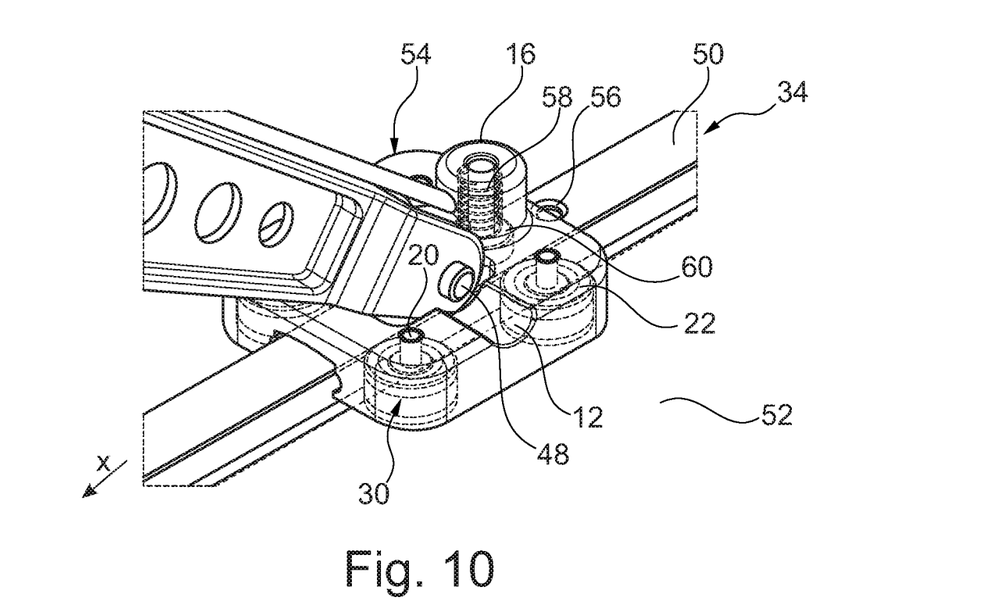

As shown in the partially transparent illustration in FIG. 10, the retaining body 16 is urged into a position towards the guide rail 34 by means of a spring 58. As a result, the retaining body 16 can have a stop surface 60 which is opposite the upper side 18 of the guide 14. The spring 58 extends between an upper, inner boundary of the guide 14 and the stop surface 60 and exerts a continuous pressure on the retaining body 16 in the direction of the guide rail 34. Release of the retaining body 16, i.e. the movement thereof away from the guide rail 34, causes said body to latch automatically in a latching opening 56 again when the retaining body 16 and the latching opening 56 align.

Figure 11:
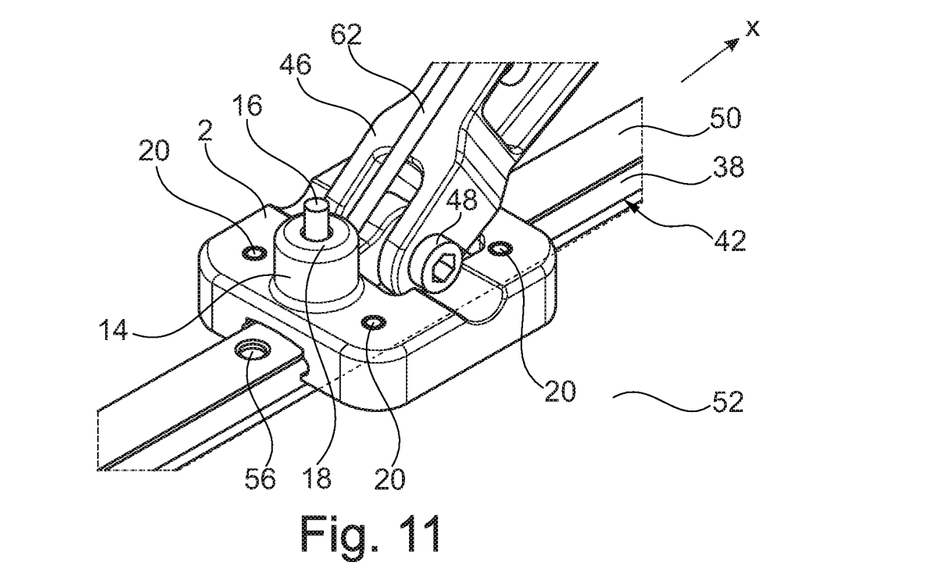
Figure 12:
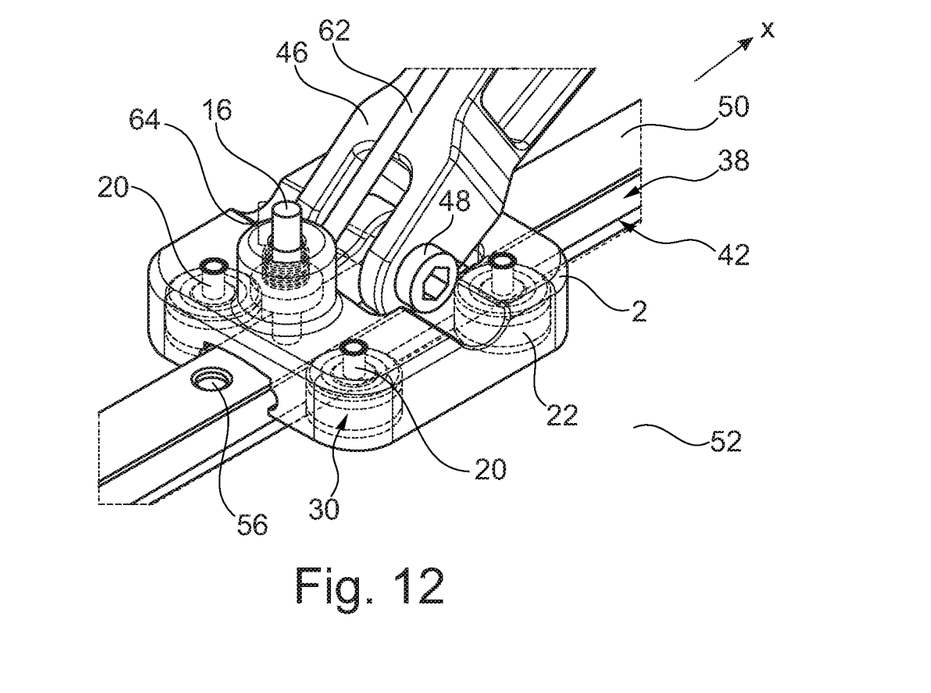

To release the retention, there can be an actuating mechanism 62, which is illustrated as a linear motion element in FIGS. 11 and 12. A force which opposes the spring force can be exerted on the retaining body 16 by a lever, a tension element or some other actuating means. The details of the embodiment of the actuating mechanism 62 are irrelevant to the fastening system according to the invention. If the retention is released, the retaining body 16 projects clearly above the outer surface 18. This projecting part is marked in an optically conspicuous way, ensuring that a user will notice that the retention has been released immediately upon looking at the slide 2.

As is shown in a partially transparent illustration in FIG. 12, the spring 58 is compressed and a coloured section 64 of the retaining body 16 projects from the guide 14. It is conceivable for all of the retaining bodies 16 to be moved by a common actuating mechanism 62. However, this is not illustrated here for the sake of simplicity.

Figure 13:
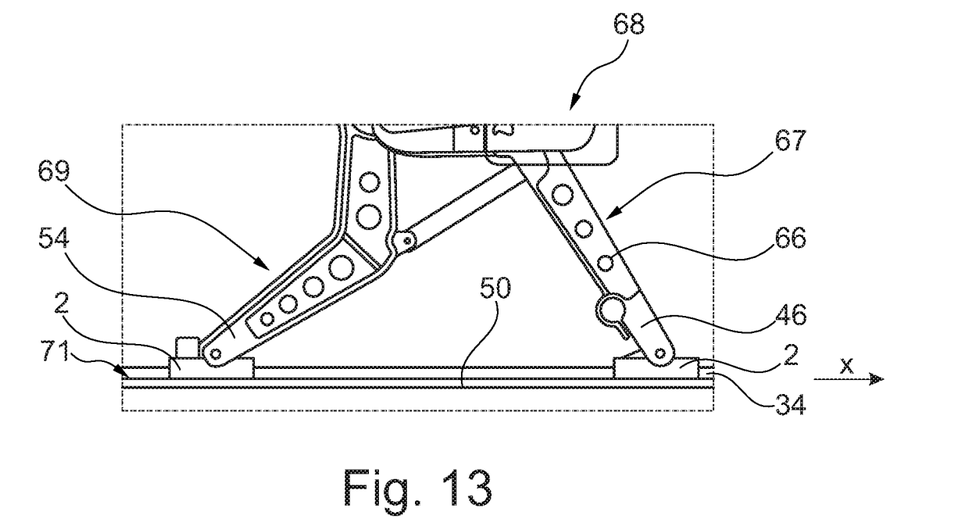
FIG. 13 shows a passenger seat which is arranged on a floor of a cabin by means of a fastening system, in a side view.
Figure 14:
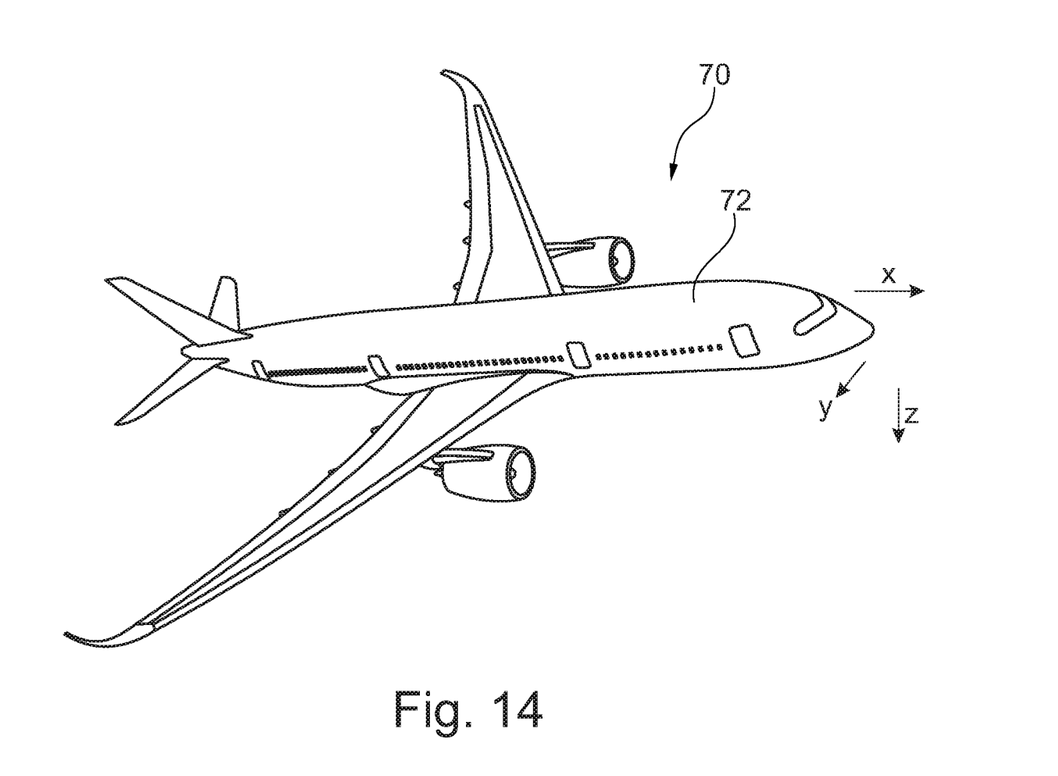
FIG. 14 shows an aircraft with a cabin and a fastening system arranged therein.

FIG. 13 shows a seat frame 66 in a side view, said seat frame having a front seat leg 67 and a rear seat leg 69. The seat frame 66 is secured by means of a plurality of slides 2, by way of the seat feet 46 and 54 shown previously, on guide rails 34 which extend parallel to one another in a floor 71 in a longitudinal direction x of a cabin of the relevant vehicle. It can be part of a passenger seat device 68 in the form of a passenger seat or of a passenger seat group in a cabin of an aircraft 70, for example. Said aircraft is illustrated in FIG. 14.

The aircraft 70 has a cabin 72, which is equipped with a plurality of such guide rails 34, which extend parallel to the longitudinal axis X of the aircraft 70. By means of such a construction, it is possible to enable seat spacings to be changed between individual flights and, at the same time, to enable cabin crew to carry out this themselves. Neither expensive tools nor great force are required to move the relevant passenger seats 68 along the longitudinal axis x.

For the sake of completeness, it should be noted that "having" does not exclude any other elements or steps and "a" or "an" does not exclude a multiplicity. It should furthermore be noted that features which have been described with reference to one of the above embodiment examples can also be used in combination with other features of other embodiment examples described above. Reference signs in the claims should not be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening system for passenger seats in a cabin of a vehicle, comprising:

at least one guide rail configured to be integrated into or onto a floor of the cabin; and at least one slide configured to be brought into engagement with the at least one guide rail and having a flange for connection to a passenger seat in order to retain the relevant passenger seat on the at least one guide rail, the flange having an opening defined therewithin, wherein the at least one guide rail has a profile cross section, perpendicularly to a main axis of extent, the at least one guide rail having a base region, a supporting region and at least one undercut situated therebetween, wherein the at least one slide has a cavity of a complementary design with the profile cross section of the at least one guide rail, and a necked region configured to be brought into engagement with the at least one undercut, thus enabling the supporting region to be enclosed by the cavity of the slide, and wherein the at least one slide has:

an upper side, a first recess defined in the upper side on a first side of the flange and a second recess defined in the upper side on a second side of the flange, the first and second recesses aligned with the opening in the flange, a first axle, a second axle, a third axle and a fourth axle, each extending perpendicularly to the upper side, the first axle extending on a first side of the first recess, the second axle extending on a second side of the first recess, the third axle extending on a first side of the second recess, the fourth axle extending on a second side of the second recess, a lower side, the lower side defining a first arcuate receiving space, a second arcuate receiving space, a third arcuate receiving space, and a fourth arcuate receiving space, and a first rotatably mounted rover mounted on the first axle and positioned within the first arcuate receiving space, a second rotatably mounted roller mounted on the second axle and positioned within the second arcuate receiving space, a third rotatably mounted roller mounted on the third axle and positioned within the third arcuate receiving space, and a fourth rotatably mounted roller mounted on the fourth axle and positioned within the fourth arcuate receiving space, each of the first rover, the second rover, the third roller, and the fourth rover configured to be brought into surface contact with a surface of the at least one guide rail.

2. The fastening system according to claim 1, further comprising a flat cover element fixed on the supporting region.

3. The fastening system according to claim 1, wherein the at least one undercut comprises two mutually opposite undercuts.

4. The fastening system according to claim 1, wherein the at least one undercut comprises two mutually opposite undercuts, and wherein the at least one slide has at least one pair of mutually opposite rollers for engagement in two mutually opposite regions of the profile cross section, the at least one pair comprising the first roller and the third roller.

5. The fastening system according to claim 1, wherein all the rollers are arranged in a common plane and are mounted so as to be rotatable about a respective axis perpendicular to the common plane.

6. The fastening system according to claim 1, wherein the at least one slide has a movably mounted retaining body configured to be moved into the cavity and out of the cavity, and wherein the at least one guide rail has latching openings configured to be brought into engagement with the retaining body when the slide is in engagement with the at least one guide rail.

7. The fastening system according to claim 6, wherein the retaining body is a sprung pin urged by a spring force into a neutral position, in which the retaining body is in the cavity.

8. The fastening system according to claim 1, wherein each of the first, second, third and fourth rotatably mounted rollers has a circumferential groove matched to a contour of the surface of the at least one guide rail.

9. The fastening system according to claim 1, wherein the necked region has at least one projection forming a clearance fit with the undercut.

* * * * *